United States Patent Office 3,514,055
Patented May 26, 1970

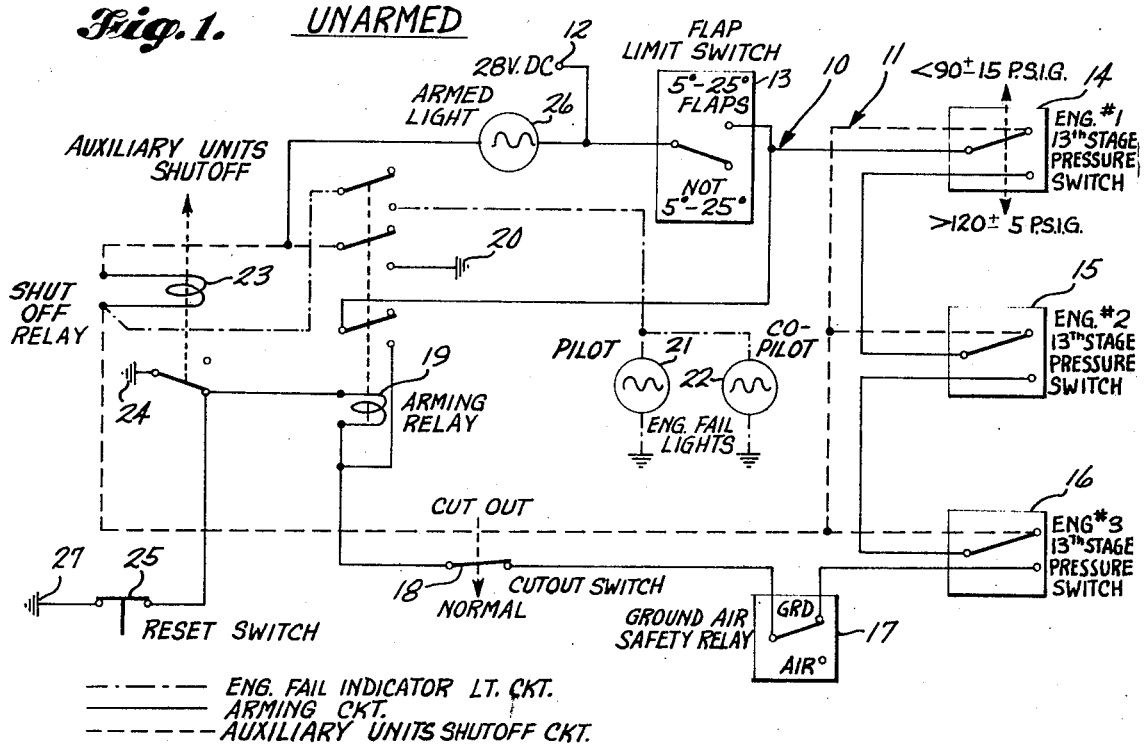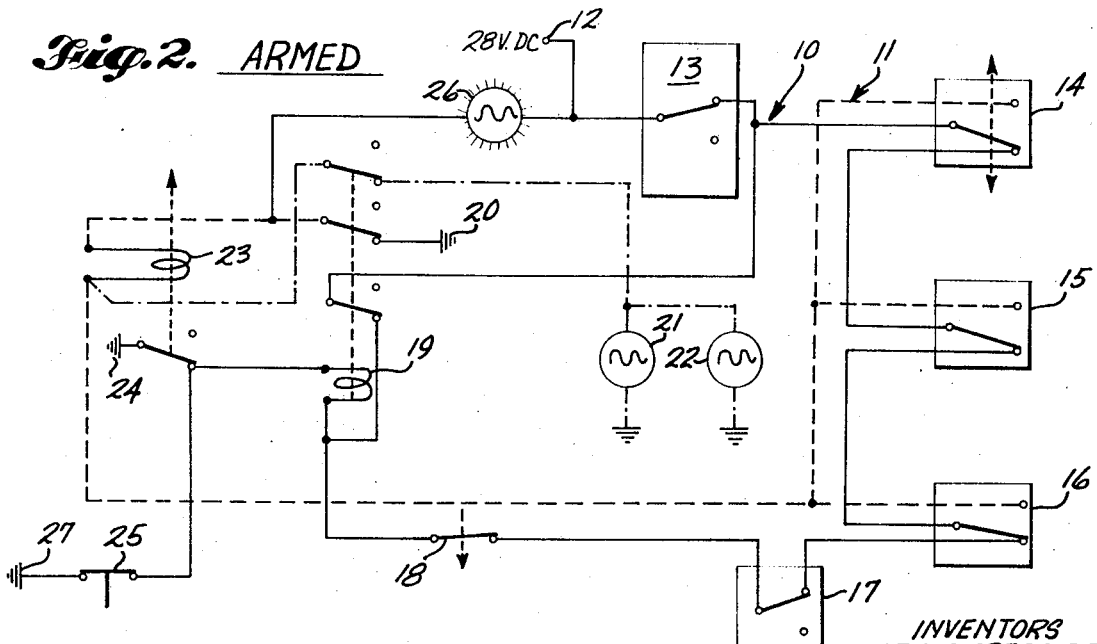

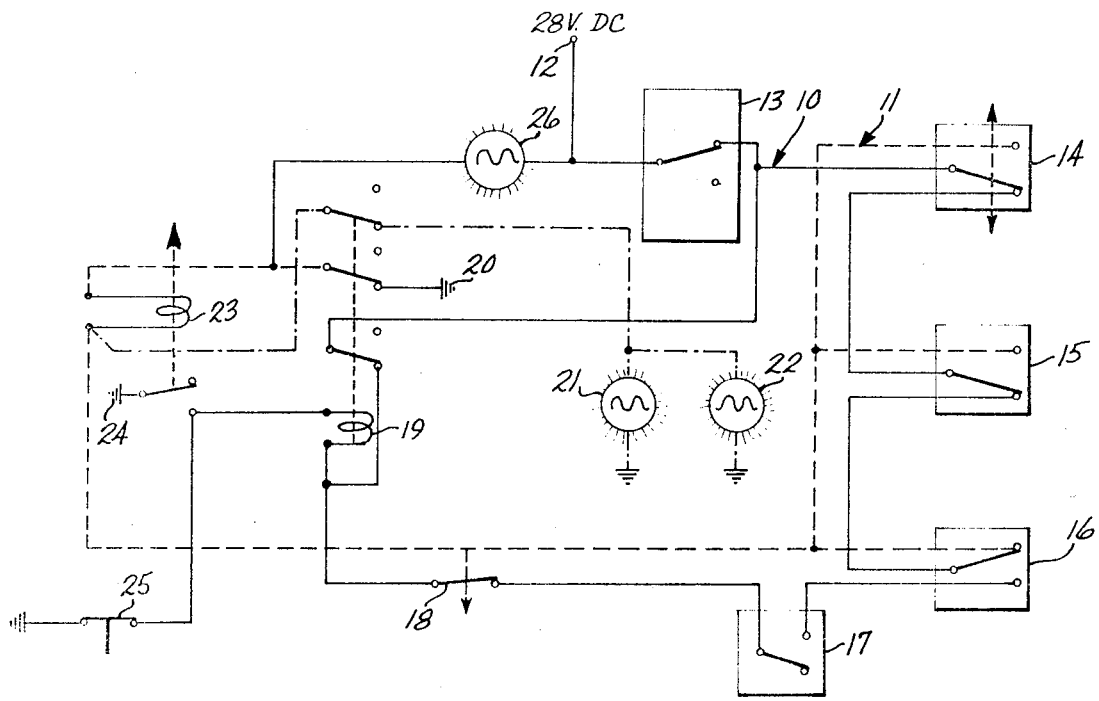
Fig.3 AUXILIARY UNITS SHUT OFF CIRCUIT ACTUATED

3,514,055
HIGH-SPEED, EMERGENCY, AUTOMATIC AUXILIARY UNITS SHUTOFF SYSTEM
Mark C. Gregoire, Issaquah, Willis R. Lambert, Seattle, and Peter J. Rothermel and Derek Rouse, Bellevue, Wash., assignors to The Boeing Company, Seattle, Wash., a corporation of Delaware
Filed June 5, 1968, Ser. No. 734,754
Int. Cl. B64d 25/00
U.S. Cl. 244—53
21 Claims

ABSTRACT OF THE DISCLOSURE

An aircraft safety method and an apparatus for carrying out the method comprising circuits responsive to failure of an engine of a multi-engine aircraft for instantaneously disconnecting all auxiliary units or systems operating off the engines to thereby instantly increase the energy available for propulsion from the remaining engines any time during the crucial period of a take-off and the initial climb phase thereafter.

A modified system applied to a single engine aircraft is effective when only partial loss of power is experienced.

BACKGROUND OF THE INVENTION

Field of the invention

This invention appears to be classified in Class 244, Subclass 53, "Power Plants or Accessories Thereto Peculiar to Aircraft and Incorporated With Aircraft Structure."

SUMMARY OF THE INVENTION

A safety method and at least one apparatus for carrying out the method is disclosed herein.

Various auxiliary systems, such as air conditioning systems, are connected to the aircraft power plants for being driven thereby. In jet aircraft, as passenger transports particularly, the high pressure air for driving these auxiliary systems is supplied from one or more of the various compressor stages of the jet engines and results in a power drain thereon, possibly as high as 10% of the total engine output.

In a multi-engine aircraft, when one engine fails during the take-off or initial climb phases of an aircraft's flight, the loss of thrust of one engine is detrimental to the safety of the aircraft, particularly when all engines or most engines are supplying power to the various systems, and particularly the air conditioning system, for example. Thus, it would be highly desirable to detect a failing engine during such flight and to increase the thrust of the remaining engines (which has never been done before) in less than 3 seconds, faster than human reaction time of a flight engineer when devoting all his attention to constant monitoring of all engine instruments. The disclosed safety system accomplishes just that; it detects the failing engine with one pressure switch thereon and immediately cuts off the engine bleed air to the auxiliary systems in less than 2½ seconds to accordingly increase the output of all remaining engines instantaneously.

Increasing the thrust of the engines during the take-off provides additional performance in the form of increased permissible operating gross weights. In addition, the system provides fast visual warning of engine power loss to the flight crew in less than one second. The flight crew would then take appropriate emergency action in a very crucial time period.

In the certification of aircraft by the FAA (U.S. Federal Aviation Administration), while the new automatic auxiliary units shutoff system can recognize and detect which engine is failing and then cut off all auxiliary systems from the other engines in less than one second for the Boeing 727–200 three engine aircraft, for example, without the new system a time delay of three seconds would be imposed on the aircraft by the FAA for the pilot to perform this job, and which three second time delay would accordingly decrease the permissible operating gross weight for limited runways or decrease the payload by 2,000 pounds, a very costly penalty.

The new safety system comprises an arming circuit for preparing the safety system for operation only during the aircraft's take-off and initial climb-out and a shutoff circuit for instantaneously cutting off the auxiliary systems upon loss of an engine and for thereby increasing the available output power of the remaining engines instantly.

Accordingly, a principal object of this invention is to provide a new safety method on multi-engine aircraft having auxiliary units running off all the engines; i.e., a new method for automatically and instantly increasing the energy available for propulsion from all engines during loss of an engine during the crucial take-off and climb-out phase of every aircraft flight.

Another principal object of this invention is to provide a system for instantaneously increasing the energy available for propulsion from the engine or engines of an aircraft upon failure of one engine during the critical period of a take-off and climb-out phase of an aircraft flight.

Another object of this invention is to provide a safety system for cutting off auxiliary units using bleed air from the aircraft jet engines, each engine utilizing only one pressure responsive switch thereon for detecting loss of the engine.

A further object of this invention is to provide a safety system for aircraft which will operate only during take-off and the initial climb-out phase of flight of the aircraft.

Another object of this invention is to provide early recognition of engine power loss to the flight crew, utilizing a warning light located directly in front of the pilots.

Other objects and various advantages of the disclosed automatic engine auxiliary units shutoff system will be apparent from the following detailed description, together with the accompanying drawings, submitted for purposes of illustration only and not intended to define the scope of the invention, reference being made for that purpose to the subjoined claims.

BRIEF DESCRIPTION OF DRAWINGS

The drawings diagrammatically illustrate by way of example not by way of limitation, one form of the invention wherein like reference numerals designate corresponding parts in the several view in which:

FIG. 1 illustrates schematically the basic electrical wiring diagram of the high speed automatic auxiliary units shutoff system in the unarmed condition;

FIG. 2 is the electrical wiring diagram of FIG. 1 illustrated in the armed condition; and FIG. 3 is the electrical wiring diagram of FIG. 1 illustrated with the auxiliary units shutoff circuit actuated.

DETAILED DESCRIPTION

A new safety method and at least one apparatus for carrying out the method are disclosed for aircraft having a plurality of engines, as jet engines in the exemplary case, and auxiliary systems or units connected to and driven by one or more of the engines; i.e., the units usually being driven by the high pressure bleed air from the compressor stages of the jet engine in the disclosed example. This safety method comprises the steps of:

(a) Monitoring the pressure of the last compressor stage of each engine with a single pressure switch mounted on each engine during the critical flight period of take-off and climb-out, (b) Detecting a decrease in pressure in the engine compressor with the pressure switch which indicates the engine is failing and (c) Instantly disconnecting the auxiliary units from all engines as by shutting off the bleed air in the instant case, which instantly increases the available output of all engines in this crucial situation of one engine out on take-off.

For carrying out the method, three figures illustrate schematically three different conditions of an aircraft new automatic engine auxiliary units shutoff safety system, or energy increasing means, for reducing take-off thrust penalty by shutting off the engine power source to the auxiliary units, as in the disclosed case bleed air, in the event of an engine failure during take-off and climb to a safe or cruise altitude.

This disclosed system comprises broadly two circuits, an arming circuit 10, FIGS. 1–3, illustrated in solid lines and a shutoff circuit 11 illustrated in dash-dash or broken lines with a small portion being shown in dot-dash lines, for cutting off the auxiliary units, such as but not limited to bleed air driven units.

ARMING CIRCUIT—10

As illustrated in FIG. 1 in solid lines, the arming circuit 10 comprises a source of electricity 12, such as 28 volt DC transformer-rectifier in this case.

Illustrated first after the electrical power source 12 in the arming circuit 10, FIG. 1, is a "flap" limit switch 13. During take-off and initial climb of an aircraft the flaps will be down anywhere between 5° and 25°, and in this position the flap limit switch 13 is closed. In any other flight attitude and corresponding flap setting, as less than 5° down flap for cruise flight or greater than 25° down flap for landing, it limit switch 13 is opened and the arming circuit is accordingly unarmed.

Next in series in the arming circuit 10, FIG. 1, is a "pressure switch" for each engine, in this case three engine pressure electrical switches 14, 15, and 16 being illustrated for the engines (not shown) of a three engine aircraft, as the Boeing 727 aircraft, for example.

After the three engines are run up to take-off power, each of the pressure switches 14, 15, and 16 in the arming circuit close, each being closed when the pressure in the last or 13th stage of the exemplary aircraft jet engine being utilized reaches 120±5 pounds per square inch, a pressure value below that developed in the 13th stage during take-off and climb. Any time an engine falters or has a substantial reduction below take-off power as indicated by the 13th stage pressure reducing to below 90±15 pounds per square inch, the pressure switch for that particular engine flips over to connect the first end of the arming circuit with the engine auxiliary units or bleed air shut-off circuit.

Also in the arming circuit is a ground/air electrical safety relay 17 which is closed by contraction of the landing gear oleo struts whereby it is ensured that the arming circuit can become armed only while the aircraft is on the ground.

Next a cut-out switch 18 is placed in the arming circuit for manually opening the circuit when desired for any reason, such as preventing the system from becoming armed during running-up of the engines on the ground.

Following in the arming circuit 10 is an "arming relay" 19 which, when activated, connects the second end of the shut-off circuit both to a ground 20 and also to engine fail indicator lights 21 and 22 for the captain and first officer, or pilot and copilot, respectively.

A reset switch 25 is spring urged to closed position. Only after the auxiliary systems, including the air conditioning system bleed-offs have been cut off, momentarily opening the reset switch 25 will reset relay 19 and restart the engine bleed-offs again.

An indicator light 26 is in the arming circuit and lights up when the circuit is energized.

AUXILIARY UNITS SHUTOFF CIRCUITS—11

The first end (illustrated on the right side of FIG. 1) of the shut-off circuit 11 shown in broken lines has three branches, each branch extending from a separate engine pressure switch 14, 15, or 16, and each branch being capable of being energized by its respective pressure switch from the arming circuit 10.

The second end of the shut-off circuit (illustrated on the left side of FIG. 1) has the relay 23 therein for being operated when the shutoff circuit 11 is energized.

"Shutoff" relay 23 which, when the shutoff circuit 11, or energy increasing means, is actuated, breaks a connection between the arming circuit 10 and a second ground 24 and simultaneously shuts off the bleed air source for the various auxiliary units from the engines.

Likewise, energizing of the circuit 11 also energizes the cockpit engine failure indicator lights 21 and 22 for the pilot and copilot, respectively, and opens the contacts of relay 23 to allow ground 27 to be the only ground for relay 19.

OPERATION

In operation, FIG. 1 shows the automatic engine bleed air shutoff system inactive and unarmed as the aircraft sits on the ground, the system comprising the arming circuit 10 (solid lines) and the shutoff circuit 11 (broken lines). In this position, the arming circuit is open because the flaps are up above 5° droop, the switch 13 accordingly being open, and each of the engines is not running up to take-off speeds as indicated by the pressure switches 14, 15, and 16 of each being open. Since the landing gear is compressed, ground/air relay 17 is closed, the cutout switch 18 is normally closed, and the reset switch 25 is normally closed.

Then for take-off, as the flaps are lowered to take-off position, the flap switch 13, FIG 2, is closed and as the aircraft engines are advanced to take-off power, each of the engine pressure switches 14, 15, and 16 close to thus arm the circuit, this arming condition being shown by the lighting of arming indicator light 26.

During the take-off and with the flaps in normal take-off position between 5° and 25°, should an engine falter and slow down, then this event is immediately detected and indicated by the pressure switch of that engine swinging over as switch 16, FIG. 3, for example, to connect the energized arming circuit 10 with the shutoff circuit 11. Thus, with energizing of the shutoff circuit, relay 23 is energized to accordingly and instantly cutoff the auxiliary system's bleed air from all engines. Immediately the output from all remaining engines is increased considerably, particularly when such an exigency exists and increased power is essential to compensate for the loss of an engine during the most crucial yet trenchant phase of the complete flight pattern of all flights, the take-off.

Likewise, "engine fail" lights 21 and 22 in the cockpit warn both the pilot and copilot that an engine has lost power, if not gone completely.

After the malfunctioning engine has been cured, or compensated for by the other engines, and normal flight resumed, the auxiliary systems may be reconnected by momentarily pressing the reset switch 25. This opening of the circuit in the arming circuit breaks the shutoff circuit to open the arming relay 19 and its contacts integral therewith.

Accordingly, the shutoff circuit 11 may be referred to as a power increasing means.

Once this crucial portion of the flight—the take-off—is over, for safety reasons none of the auxiliary systems can be cut off by this automatic shutoff system until the next take-off of the aircraft, since the "ground air" switch 17 is opened by extension of the landing gear and accordingly the arming circuit cannot be rearmed in the air for either automatically or inadvertently cutting off the auxiliary units. For additional safety, the manually cutout switch 18 is provided for operation at any time desired.

Accordingly, a safety method and at least one mechanism for carrying out the method have been disclosed, the latter comprising an automatic engine bleed air shutoff system responsive to merely one single pressure switch on the failing engine which instantly increases the power from the remaining engines during the critical and crucial take-off period of each flight by cutting off the auxiliary systems bleed air from all engines.

While this system was designed for and used on multi-engine aircraft, with more design work it may be modified and applied to a single engine aircraft whereby upon slowing down and loss of partial power of the engine, instant increase of what little power there is available results by cutting off the drain of power caused by all auxiliary systems until the engine clears up or the aircraft "limps" back into the airfield.

While a method and only two embodiments of the invention have been shown in the accompanying specification and drawings, it will be evident that various other modifications are possible in the arrangement and construction of the disclosed highspeed, emergency, automatic auxiliary units shutoff system without departing from the scope of the invention and it is accordingly desired to comprehend within the purview of this invention such modifications as may be considered to fall within the scope of the appended claims.

We claim:

1. In an aircraft having a plurality of engines and an auxiliary unit connected to at least one of the engines, a safety method comprising the steps of,
   (a) detecting with a single instrument on each engine the failure of an engine during take-off and subsequent climb-out,
   (b) instantaneously disconnecting the auxiliary unit from all engines connected thereto, whereby the available energy for propulsion from all remaining engines formerly connected to the auxiliary unit is increased substantially during the critical period of take-off and subsequent climb-out, and
   (c) operating said remaining engines after disconnection of said auxiliary unit.

2. In an aircraft having a plurality of jet engines and an auxiliary unit connected to at least one of the engines, a safety method comprising the steps of,
   (a) monitoring the pressure of each of said engines with a single pressure switch on each engine during a take-off and subsequent climb-out,
   (b) detecting a decrease in the pressure of a faltering engine,
   (c) increasing the available energy for propulsion of the remaining engines having an auxiliary unit connected thereto by instantly disconnecting said auxiliary unit from said remaining engines connected thereto, and
   (d) operating said remaining engines thereafter.

3. In a multi-engine aircraft having at least one auxiliary unit connected to at least one engine, when one engine fails the method for increasing the available energy for propulsion from all remaining engines formerly connected to said auxiliary unit comprising,
   (a) monitoring the operability of each engine with a single monitoring means on each engine,
   (b) detecting the failure of an engine with the single monitoring means,
   (c) instantaneously disconnecting all auxiliary units from all engines connected thereto, and
   (d) operating said remaining engines thereafter.

4. In an aircraft having a plurality of engines and an auxiliary unit connected to at least one of the engines, a safety system comprising,
   (a) single detection means on each of said engines for detecting failure of its engine,
   (b) auxiliary unit disconnect means,
   (c) said auxiliary unit disconnect means being responsive to any one of said single detection means having a failing engine for increasing the available energy for propulsion from the remaining engines having an auxiliary unit connected thereto by disconnecting said auxiliary unit from said remaining engines connected thereto, and
   (d) means for maintaining said remaining engines operating after said failing engine has failed.

5. In a safety system as recited in claim 4 wherein,
   (a) said auxiliary unit is connected to more than one of said engines.

6. In a safety system as recited in claim 4 wherein,
   (a) said auxiliary unit is connected to each of said engines.

7. In an aircraft having a plurality of engines and an auxiliary unit connected to at least one of the engines, a safety system comprising,
   (a) said auxiliary unit is an air conditioner driven by said at least one of said engines,
   (b) single detection means on each of said engines for detecting failure of its engine,
   (c) air conditioner disconnect means, and
   (d) said air conditioner disconnect means being responsive to any one of said single detection means having a failing engine for disconnecting said air conditioning from said at least one of said engines connected thereto.

8. In an aircraft having a plurality of engines and an auxiliary unit connected to at least one of the engines where said at least one engine has a multistage compressor, a safety system comprising,
   (a) single detection means on each of said engines for detecting failure of its engine,
   (b) one of said single detection means comprises a pressure switch on the highest pressure stage of said compressor for detecting failure of its engine,
   (c) auxiliary unit disconnect means, and
   (d) said auxiliary unit disconnect means is responsive to said pressure switch indicating a failing engine for disconnecting said unit from said at least one of the engines connected to said unit.

9. In a safety system as recited in claim 4 wherein,
   (a) said auxiliary unit disconnect means comprises an electrical circuit means including each of said single detection means therein, and
   (b) said circuit means is responsive to any one of said single detection means having a failing engine for increasing the available energy for propulsion of said remaining engines having an auxiliary unit connected thereto by disconnecting said unit from said remaining engines connected to said unit.

10. In a safety system as recited in claim 4 wherein,
    (a) said auxiliary unit disconnect means comprises an electrical circuit means having a disconnect relay means, and
    (b) said relay means is responsive to any one of said single detection means having a failing engine for increasing the available energy for propulsion of said remaining engines having an auxiliary unit connected thereto by being energized for disconnecting said unit from said remaining engines connected to said unit.

11. In a safety system as recited in claim 9 wherein,
(a) said electrical circuit means comprises an arming circuit means including each of said single detection means and an auxiliary unit shutoff circuit means, and
(b) said disconnect means is responsive to said arming circuit means for increasing the available energy for propulsion of said remaining engines having an auxiliary unit connected thereto by disconnecting said auxiliary unit from said at least one of the engines connected to said unit when any one of said single detecting means has a failing engine.

12. In a safety system as recited in claim 11 wherein,
(a) said arming circuit means has an arming relay for closing said arming circuit, and
(b) said disconnect means is responsive to said closed arming circuit for increasing the available energy for propulsion of said remaining engines having an auxiliary unit connected thereto by disconnecting said auxiliary unit from said remaining engines connected to said unit means when any one of said single detection means has a failing engine.

13. In a safety system as recited in claim 11 wherein said aircraft has a landing gear,
(a) said arming circuit means includes a ground/air switch means, and
(b) said ground/air switch means is responsive to the location of said landing gear on the ground for closing said arming circuit means.

14. In a safety system as recited in claim 11 wherein,
(a) said auxiliary unit disconnect circuit means includes an auxiliary unit shutoff relay means, and
(b) said auxiliary unit shutoff relay means is responsive to said arming circuit means for increasing the available energy for propulsion of said remaining engines having an auxiliary unit connected thereto by disconnecting said auxiliary unit from said remaining engines connected to said unit when any one of said single detection means has a failing engine.

15. In an aircraft having flaps, a plurality of engines, and an auxiliary unit connected to at least one of the engines, a safety system comprising,
(a) single detection means on each of said engines for detecting failure of its engine,
(b) auxiliary unit disconnect means, said auxiliary unit disconnect means comprises an arming circuit means including each of said single detection means and an auxiliary unit shutoff circuit means,
(c) said arming circuit means includes a flap location switch means,
(d) said flap location switch means being responsive to said flaps being in take-off position for closing said arming circuit means, and
(e) said auxiliary unit shutoff circuit means is responsive to said arming circuit means for disconnecting said auxiliary unit from said at least one of said engines connected to said unit when any one of said single detection means has a failing engine.

16. In an aircraft having flaps, a plurality of engines, and an auxiliary unit connected to at least one of the engines, a safety system comprising,
(a) single detection means on each of said engines for detecting failure of its engine,
(b) auxiliary unit disconnect circuit means, said auxiliary unit disconnect circuit means comprising an arming circuit means including each of said single detection means and an auxiliary unit shutoff circuit means,
(c) said auxiliary unit shutoff circuit means is responsive to said arming circuit means for disconnecting said auxiliary unit from said at least one of said engines connected to said unit when any one of said single detection means has a failing engine,
(d) said arming circuit means includes a flap location switch means, and
(e) said flap location switch means being responsive to said flaps being in other than take-off position for disarming said arming circuit means.

17. In a safety system as recited in claim 14 wherein,
(a) said arming circuit means includes reset switch means, and
(b) said auxiliary unit shutoff relay means is responsive to said reset switch means for being inactivated.

18. In an aircraft having a plurality of engines, and an auxiliary unit connected to at least one of the engines, a safety system comprising,
(a) single detection means on each of said engines for detecting failure of its engine,
(b) auxiliary unit disconnect means comprising an arming circuit means including each of said single detection means and an auxiliary unit shutoff circuit means,
(c) one of said single detection means is a single pressure switch means on one of said engines,
(d) said pressure switch means is responsive to said one engine being run at take-off power to close said arming circuit means, and
(e) said auxiliary unit shutoff circuit means is responsive to said arming circuit means for disconnecting said auxiliary unit from said at least one of said engines connected to said unit when any one of said single detection means has a failing engine.

19. In an aircraft having a plurality of engines, and an auxiliary unit connected to at least one of the engines, a safety system comprising,
(a) single detection means on each of said engines for detecting failure of its engine,
(b) auxiliary unit disconnect means, said auxiliary unit disconnect means comprising an arming circuit means including each of said single detection means and an auxiliary unit shutoff circuit means,
(c) one of said single detection means is a single pressure switch means on one of said engines,
(d) said pressure switch means is responsive to said one engine slowing down to below take-off power to connect said arming circuit means with said auxiliary unit shutoff circuit means, and
(e) said auxiliary unit shutoff circuit means is responsive to said arming circuit means for disconnecting said auxiliary unit from said at least one of said engines connected to said unit when any one of said single detection means has a failing engine.

20. In an aircraft having a plurality of engines and an auxiliary unit connected to at least one of the engines, a safety system comprising,
(a) single detection means comprising a single instrument on each of said engines for detecting failure of the engine,
(b) energy increasing means,
(c) each of said single instrument detection means being connected to said energy increasing means,
(d) said energy increasing means being responsive to any one of said single instrument detection means of a failing engine for increasing the available energy for propulsion of the remaining engines by disconnecting said auxiliary unit from at least one engine, and
(e) means for maintaining said remaining engines operating after said failing engine has failed.

21. In an aircraft having a main propulsion engine and an auxiliary unit connected to said engine, an aircraft safety system comprising,
(a) single detection means on said engine for detecting a slowing down of said engine,
(b) auxiliary unit disconnect means, and
(c) said auxiliary unit disconnect means being responsive to said single detection means on a slowing engine for disconnection of said auxiliary unit from said engine for increasing the output energy available for propulsion from said engine.

References Cited

UNITED STATES PATENTS

| | | | |
|---|---|---|---|
| 2,223,708 | 12/1940 | Van Nes | 244—53 |
| 2,515,639 | 7/1950 | Draney | 244—118 |
| 2,597,020 | 5/1952 | Nissen | 244—76 |
| 2,677,516 | 5/1954 | Pilling | 244—103 |
| 2,961,939 | 11/1960 | Typaldos | 98—1.5 |
| 3,160,367 | 12/1964 | LeCarme | 244—76 |

FOREIGN PATENTS

| | | |
|---|---|---|
| 528,963 | 11/1940 | Great Britain. |
| 578,311 | 6/1946 | Great Britain. |

MILTON BUCHLER, Primary Examiner

J. E. PITTENGER, Assistant Examiner

U.S. Cl. X.R.

60—39.15